United States Patent [19]

Hibner et al.

[11] Patent Number: 5,058,460
[45] Date of Patent: Oct. 22, 1991

[54] CLUTCH-TO-CLUTCH CONTROL IN AN AUTOMATIC TRANSMISSION

[75] Inventors: John A. Hibner, Coldwater, Ohio; Carl A. Lentz, Mooresville, Ind.

[73] Assignee: General Motors Corporation, Detroit, Mich.

[21] Appl. No.: 463,717

[22] Filed: Jan. 11, 1990

[51] Int. Cl.$^5$ ............................................. B60K 41/22
[52] U.S. Cl. .................................. 74/867; 192/109 F
[58] Field of Search .............. 475/120, 121, 122, 123, 475/127, 128; 192/87.11, 87.12, 3.58, 109 C; 74/867

[56] References Cited

U.S. PATENT DOCUMENTS

| | | | |
|---|---|---|---|
| 3,752,011 | 8/1973 | Casey et al. | 475/120 X |
| 3,754,482 | 8/1973 | Sanders et al. | 475/120 |
| 4,086,994 | 5/1978 | Hirosawa et al. | 192/109 F |
| 4,150,737 | 4/1979 | Patton | 192/109 F X |
| 4,289,221 | 9/1981 | Chambers et al. | 192/109 F X |
| 4,380,278 | 4/1983 | Lasken | 192/3.58 |
| 4,527,678 | 7/1985 | Pierce et al. | 192/3.58 |
| 4,529,072 | 7/1985 | Oguma et al. | 192/3.58 X |
| 4,646,891 | 3/1987 | Braun | 192/3.58 |
| 4,662,488 | 5/1987 | Hiramatsu et al. | 192/3.58 |
| 4,790,418 | 12/1988 | Brown et al. | 475/120 X |

*Primary Examiner*—Leslie A. Braun
*Assistant Examiner*—Matthew Stavish
*Attorney, Agent, or Firm*—Mark A. Navarre

[57] ABSTRACT

In an automatic transmission, upshifting is controlled by ramping down the pressure in an off-going clutch associated with a high speed ratio and increasing the pressure in an on-coming clutch associated with a lower speed ratio. The on-coming clutch has commanded pressure at a maximum value for an initial fill time, a lower increasing ramp value during the ramp of the off-going clutch until the on-coming clutch starts to engage, and then a closed-loop control until the clutch reaches a synchronous speed. The closed-loop control parameter is on-coming clutch slip speed which is controlled to a calculated slip speed profile. The profile has a first steep slope and a final less steep slope so that the actual slip can smoothly go to zero in a given time period.

3 Claims, 10 Drawing Sheets

FIG. 1a

| RANGE | CLUTCHES APPLIED | | | | |
|---|---|---|---|---|---|
| | C1 | C2 | C3 | C4 | C5 |
| FWD 1 | X | | | | X |
| 2 | X | | | X | |
| 3 | X | | X | | |
| 4 | X | X | | | |
| 5 | | X | X | | |
| 6 | | X | | X | |
| REV 1 | | | X | | X |

CLUTCH-TO-CLUTCH CONTROL IN AN AUTOMATIC TRANSMISSION

FIELD OF THE INVENTION

This invention relates to a method of controlling a shift in an automatic transmission, and more particularly, for a clutch-to-clutch shift.

BACKGROUND OF THE INVENTION

Generally, a motor vehicle automatic transmission includes a number of gear elements coupling its input and output shafts, and a related number of torque establishing devices, such as clutches and brakes which are selectively engageable to activate certain gear elements for establishing a desired speed ratio between the input and output shafts. The brake can be of the band type or disk type; engineering personnel in the automotive art refer to disc type brakes in transmissions as "clutches" or "reaction clutches". As used herein, the terms "clutches" and "torque transmitting devices" will be used to refer to brakes as well as clutches.

The input shaft is connected to the vehicle engine through a fluid coupling, such as a torque converter, and the output shaft is connected directly to the vehicle wheels. Shifting from one forward speed ratio to another is performed in response to engine throttle and vehicle speed, and generally involves releasing or disengaging the clutch (off-going) associated with the current speed ratio and applying or engaging the clutch (on-coming) associated with the desired speed ratio.

The speed ratio is defined as the transmission input speed or turbine speed divided by the output speed. Thus, a low gear range has a high speed ratio, and a higher gear range has a lower speed ratio. To perform an upshift, a shift is made from a high speed ratio to a low speed ratio. In the type of transmission involved in this invention, the upshift is accomplished by disengaging a clutch associated with the higher speed ratio and engaging a clutch associated with the lower speed ratio to thereby reconfigure the gear set to operate at the lower speed ratio. Shifts performed in the above manner are termed clutch-to-clutch shifts and require precise timing in order to achieve high quality shifting.

SUMMARY OF THE INVENTION

It is therefore an object of the invention to provide a method of controlling a clutch-to-clutch shift by establishing a slip speed profile and controlling the slip speed of the on-coming clutch to the profile by adjusting the pressure on one of the clutches to minimize the slip speed error.

Another object is to generate a slip speed profile which quickly and smoothly achieves on-coming clutch synchronization.

It is another object of the invention to provide a method of controlling an upshift in an automatic transmission by disengaging one clutch and engaging another clutch in a controlled manner and using transmission speed feedback to manage the control. In particular, a motor vehicle automatic transmission with an electronic control system achieves high quality shifts by monitoring input and output speed to determine the effects of the clutch operations on the input speed and calculating on-coming clutch slip for closed-loop clutch control.

BRIEF DESCRIPTION OF THE DRAWINGS

The above and other advantages of the invention will become more apparent from the following description taken in conjunction with the accompanying drawings wherein like references refer to like parts and wherein:

FIG. 1b is a diagram illustrating the clutch engagements required to establish the various speed ratios of the transmission depicted in FIG. 1a.

DETAILED DESCRIPTION OF THE INVENTION

Figure 1A:
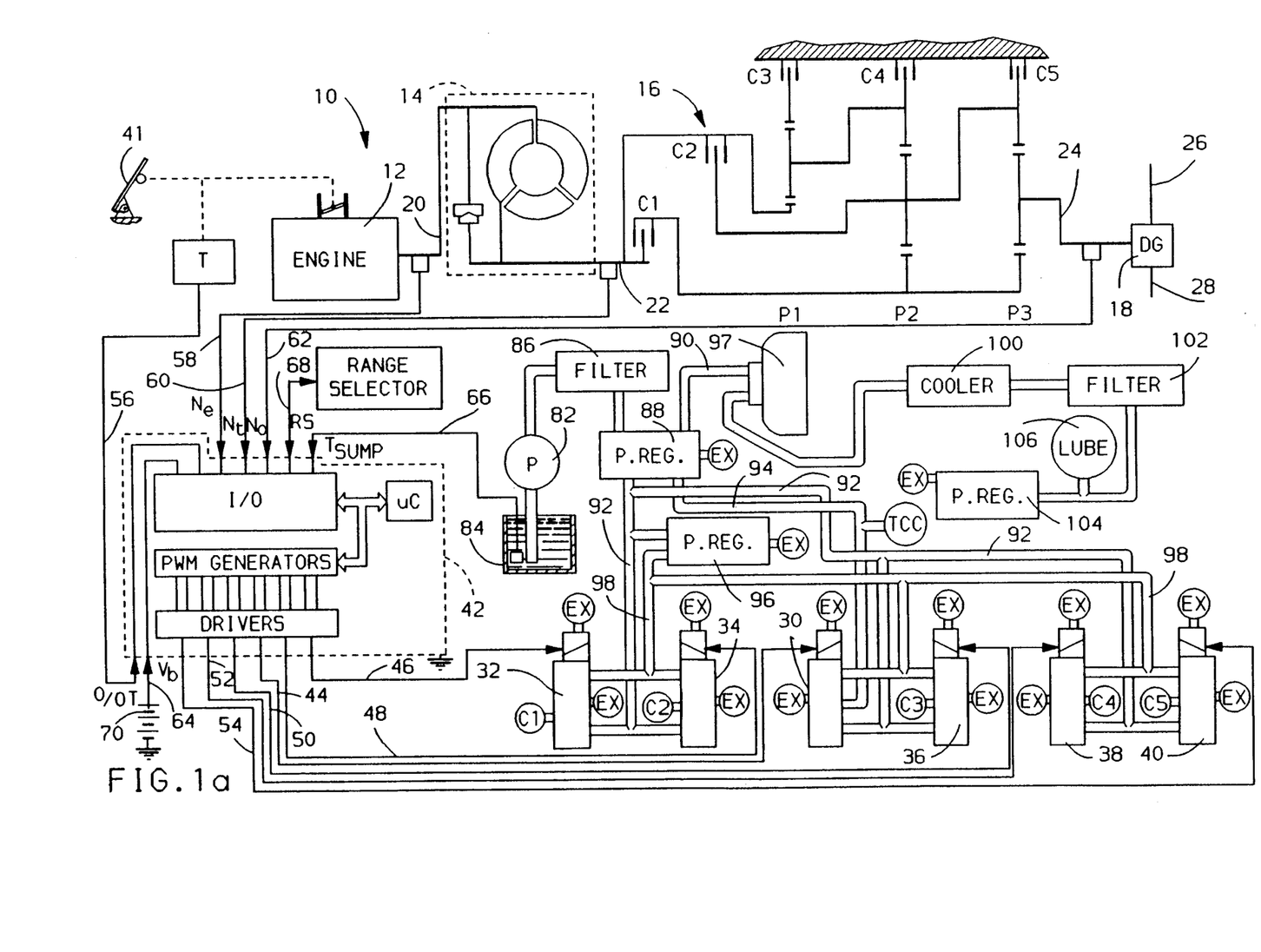
FIG. 1a is a system diagram of a fluid operated motor vehicle transmission, including several solenoid operated fluid pressure control valves and a computer-based control unit for carrying out the voltage control technique of this invention.

Referring now to the drawings, and more particularly to FIG. 1a, the reference numeral 10 generally designates a motor vehicle drive train including a throttled internal combustion engine 12, a fluidic torque converter 14, a six-speed fluid operated power transmission 16 and a differential gear set (DG) 18. The engine 12 is connected to the torque converter 14 via shaft 20, the torque converter 14 is connected to the transmission 16 via shaft 22, the transmission 16 is connected to the differential gear set 18 via shaft 24 and the differential gearset is connected to a pair of drive wheels (not shown) via the prop shafts 26 and 28.

Gear shifts are accomplished by selectively engaging and disengaging brakes and clutches, herein called torque transmitting devices or clutches. These clutches are actuated by hydraulic pressure and upon engagement, require a fill time before torque is transmitted between a driving and a driven friction element.

Figure 1B:
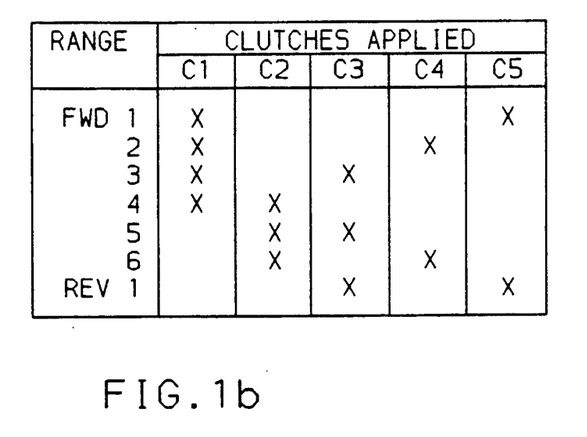

The speed and torque relationships between the engine 12 and the drive wheels of the vehicle are controlled by a fluid operated torque converter clutch, designated TCC, and five fluid operated transmission clutches, designated C1–C5. The torque converter clutch TCC is selectively engaged by the solenoid operated control valve 30 to mechanically connect the impeller I and turbine T of torque converter 14. The clutches TCC, C1, C2, C3, C4, C5 are selectively engaged and disengaged by the solenoid operated control valves 30, 32, 34, 36, 38, 40 according to the diagram shown in FIG. 1b, to selectively establish a desired transmission speed ratio. The illustrated transmission gear set provides one reverse ratio and six forward ratios, and is described in detail in the U.S. Pat. No. 4,070,927 to Polak, issued Jan. 31, 1978, and assigned to the assignee of the present invention. An operator manipulated accelerator pedal 41 positions the engine throttle for controlling the engine power output.

The operation of the solenoid operated control valves 30-40 is controlled by a computer-based control unit 42 via lines 44-54 in response to various input signals representative of system parameters. Such inputs include an engine throttle position signal %T on line 56, an engine output shaft speed signal Ne on line 58, a torque converter output shaft speed signal Nt on line 60, a transmission output shaft speed signal No on line 62, a system supply voltage signal Vb on line 64, a transmission fluid temperature signal Tsump on line 66 and an operator range selector position signal RS on line 68. The system voltage is supplied by the storage battery 70, and the input signals are obtained with conventional electrical transducers such as potentiometers, thermistors and magnetic speed pickups.

Internally, the control unit 42 comprises a number of conventional devices including a microcomputer (uC) with internal clock and memory, an input/output device (I/O) and an array of PWM generators (PWM) and drivers (DR). As indicated below, a PWM generator and a driver (DR) are dedicated to each solenoid control valve 30-40. The PWM outputs are delivered to the respective drivers (DR) and are used to energize the respective solenoid control valves. The duty cycle of the PWM outputs determine the hydraulic pressure supplied by the solenoid control valves, with a low percent duty cycle yielding a low pressure and a high percent duty cycle yielding a high pressure for a normally closed valve.

The hydraulic circuit of transmission 16 includes a positive displacement pump 82 for supplying pressurized hydraulic fluid from the sump or reservoir 84, to the clutches TCC and C1-C5 through various hydraulic and electro-hydraulic valving mechanisms. After passing through a main circuit filter 86, the fluid output of pump 82 is directed to a main pressure regulator valve 88 which develops regulated fluid pressures in lines 90 and 92.

The fluid in line 90, generally referred to as converter feed pressure, is directed through the torque converter 14, as schematically designated by the converter shell 97. After passing through a cooler 100 and cooler filter 102, the converter fluid is then regulated down to a lower pressure by the regulator valve 104 and directed to the transmission lube circuit, as designated by the bubble 106.

The fluid in line 92, generally referred to as main or line pressure, is supplied as an input to the clutch control valves 30-40, and also to the control pressure regulator valve 96. The control pressure regulator valve 96 develops a somewhat lower pressure in line 98, referred to herein as the control pressure, such pressure being directed to the solenoid of each control valve 30-40.

The fluid in line 94, referred to as the converter clutch pressure, is supplied directly by solenoid 30 to the torque converter clutch TCC to engage the same. This pressure is also supplied to the main regulator valve 88 to provide a lower regulated line pressure in the converter lock-up mode.

FIGS. 2, 3 and 6-11 are flow diagrams representative of computer program instructions executed by the computer-based control unit 42 of FIG. 1 in carrying out the shift control technique of this invention. In the description of the flow diagrams other than FIG. 2, the functional explanation marked with numerals in angle brackets, <nn>, refers to blocks bearing that number.

Figure 2:
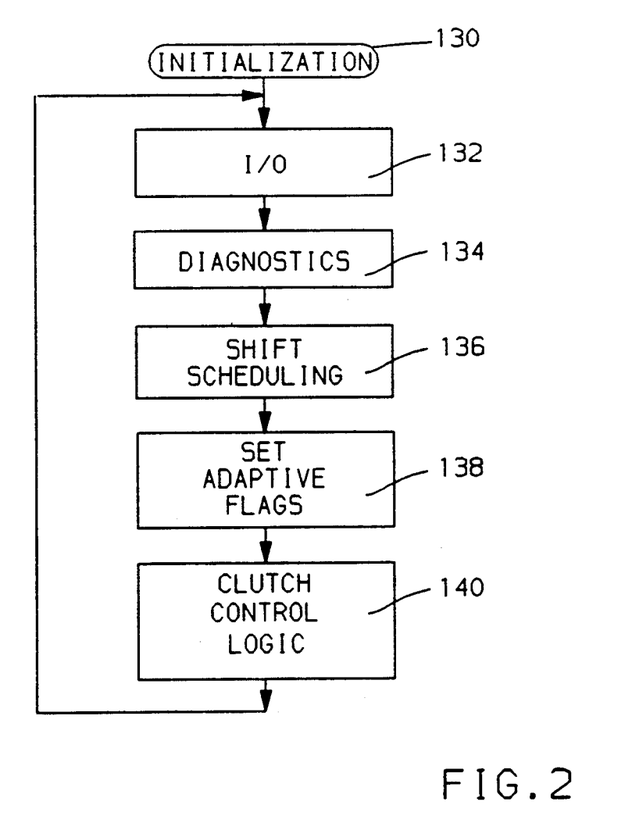
FIGS. 2 and 3a–3b are flow diagrams representative of computer program instructions executed by the computer-based controller of FIG. 1a in carrying out the shift control of the transmission.

FIG. 2 represents an executive or main loop program which directs the sequential execution of various subroutines. Block 130 designates a series of instructions executed at the initiation of each period of vehicle operation for setting the various timers, registers and variable values of control unit 42 to predetermined initial values. Thereafter, the blocks 132-140 are sequentially and repeatedly executed as indicated by the flow diagram lines. Block 132 reads the various input signal values and outputs the required control signals to the PWM generators and drivers for solenoid controlled valves 30-40. Blocks 134-138 contain diagnostic, shift scheduling, and adaptive flag logic. The clutch control logic block 140 analyzes the various system input signals described above in reference to FIG. 1a, develops pressure command signals PCMD for application to the solenoid operated control valves at the next execution of block 132, and computes adaptive corrections based on the adaptive flags at shift completion. Block 140 also effects pulse-width-modulation of the solenoid drive voltage to carry out the pressure commands for specific shift operations. Block 140 is detailed in the flow chart of FIGS. 3a-3b.

Figure 3A:
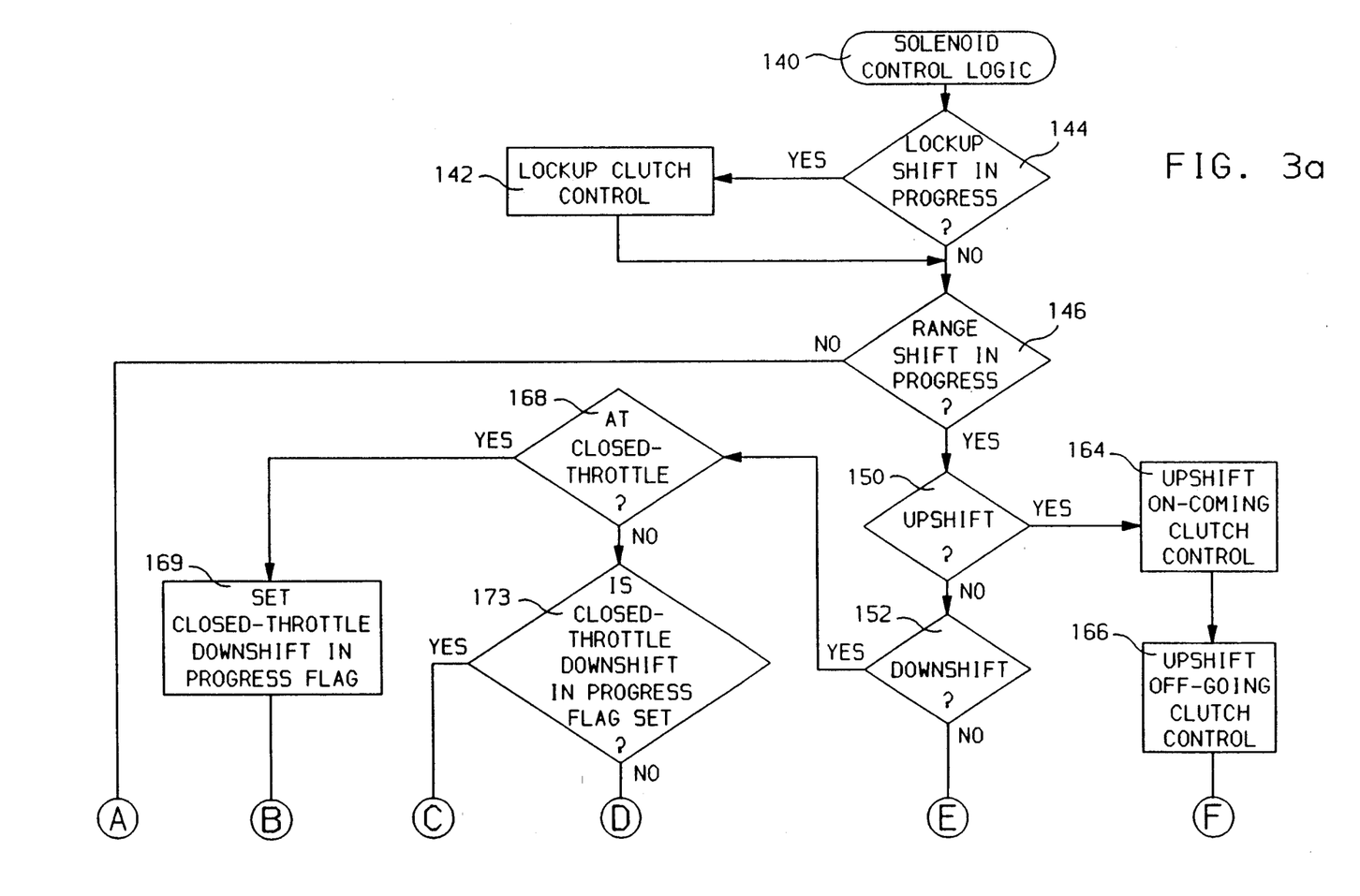
Figure 3B:
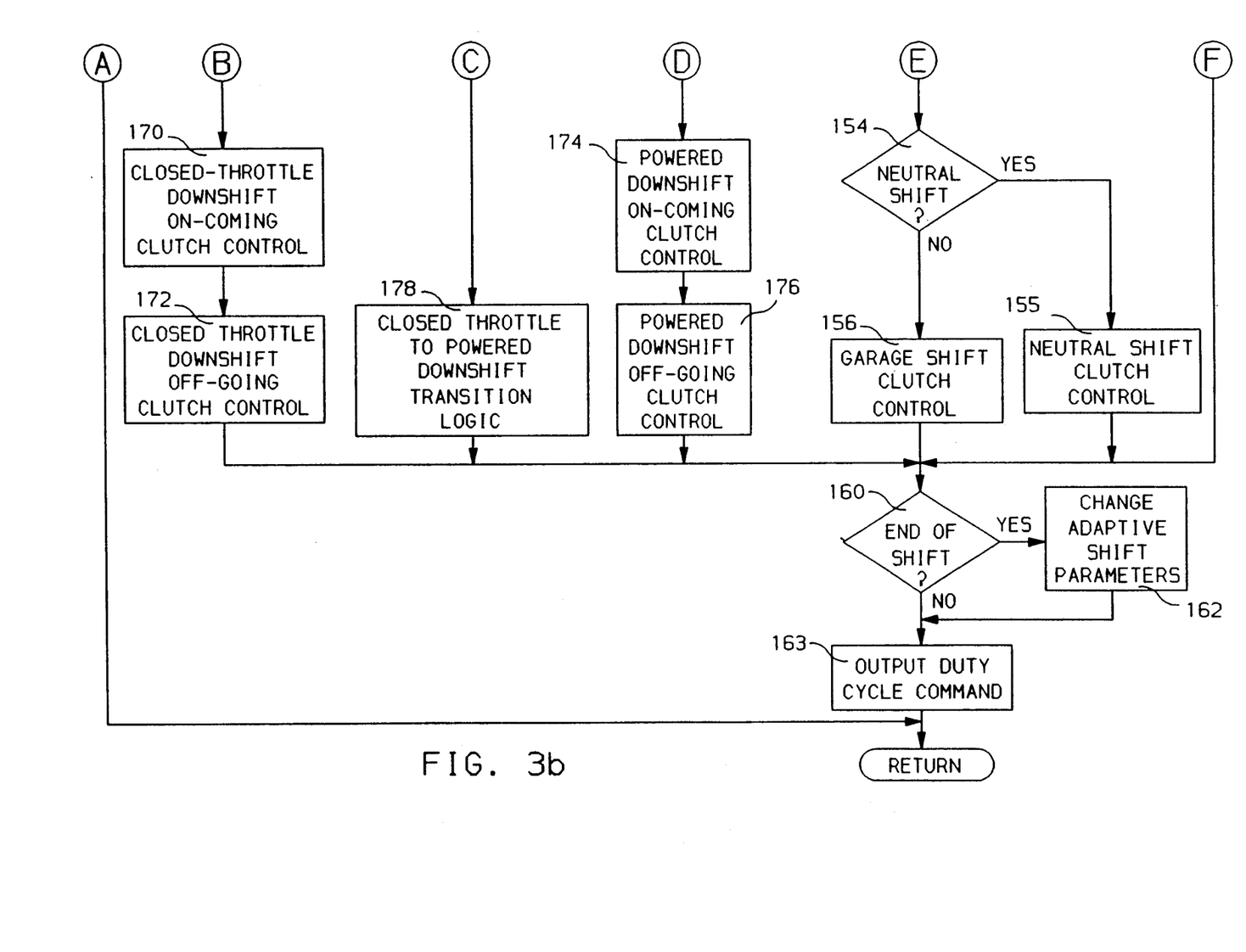

The flow diagram of FIGS. 3a-3b sets forth the program for making decisions as to the type of range shift in progress, if any, and determines the specific control for the on-coming and the off-going clutches. The program also checks whether a shift has performed within specifications, and if not, certain shift parameters are changed at shift completion according to predefined adaptive logic to correct the shift. First, lockup clutch control is executed <142> if a lockup shift is in progress <144>. Then it is determined (from the shift schedule) whether a range shift is in progress <146>. If not, the clutch control logic is exited. If a range shift is in progress <146>, it is determined whether it is an upshift <150>, a downshift <152>, a neutral shift <154>, or a garage shift <156>. A garage shift is a shift from neutral to either drive or reverse, or a shift from drive to reverse or from reverse to drive. The control flows from either the upshift, downshift, neutral shift or the garage shift block to the end-of-shift test <160>. Once the shift is completed <160>, adaptive shift parameters are changed if required <162> and the duty cycle command is output <163>. If the shift has not ended <160>, the duty cycle command is output <163> before returning to the main loop of FIG. 2.

If an upshift is indicated <150>, the upshift on-coming clutch control <164> and the upshift off-going clutch control <166> are activated. If a downshift is indicated <152>, it is next decided whether it is a closed throttle downshift or a powered downshift <168>. If it is closed throttle, a closed throttle in progress flag is set <169>, the closed throttle on-coming clutch control is activated <170> and the closed throttle off-going clutch control is activated <172>. If the downshift is not at closed throttle <168>, the closed throttle flag is checked <173>. If the flag is not set, the powered downshift on-coming clutch control <174> and the powered downshift off-going clutch control <176> are activated. If the closed throttle flag is set <173>, the throttle opened during the course of the closed throttle downshift and a transition to powered downshift may be necessary; in such case, the appropriate transition logic is invoked <178>. If the shift is a neutral shift <154>, the neutral shift clutch control executes shifts from drive to neutral or from reverse to neutral <1585.

Each control phase operates by setting pressures, pressure increments, times or other values to predefined calibrated values which are herein generally called "set", "preset", "given" or "certain" values. Each such value is chosen from a table of calibrated values for each specific transmission condition, throttle range and shift type. Thus, different values are supplied for upshift, downshift, etc. as well as each range shift, e.g., 1-2, 2-1, 4-3, 5-4, etc. Converter and lockup modes may also require separate sets of calibration values.

Figure 4:
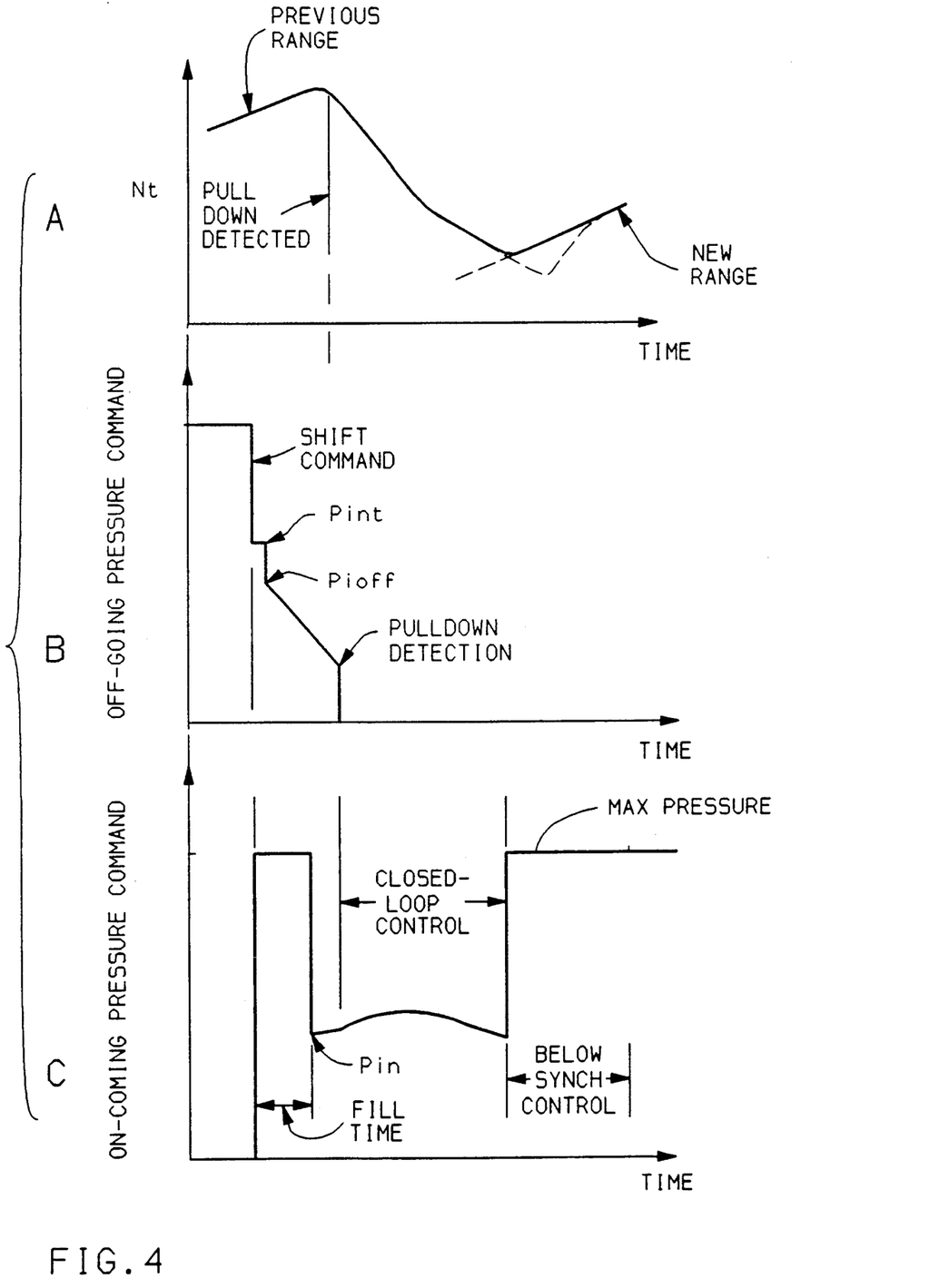
FIG. 4, graphs A, B and C, are graphs illustrating turbine speed, off-going pressure command and on-coming pressure command, respectively, for clutch-to-clutch shifting according to the invention.

FIG. 4, graphs A, B, and C, detail the controlled clutch pressure for an upshift as well as the turbine speed or input speed. Graph A is a graph of turbine speed versus time, graph B, shows the commanded pressure versus time for the off-going clutch, and graph C shows the commanded pressure versus time for the on-coming clutch. Graph A curve is typical for the case of increasing vehicle speed prior to shift initiation, and indicates the turbine speed during the first range, the speed decrease during shifting, and increase again at a lower level after shifting. The peak of the turbine speed is due to the slowing action of the oncoming clutch, causing slip of the off-going clutch, and is indicative of "turbine pulldown". Turbine pulldown is detected by sensing when the turbine speed falls a set amount below the output speed multiplied by the higher speed ratio. The speed after shifting is "synchronous speed", i.e., the turbine speed ($N_t$) equals the output speed ($N_o$) times the lower speed ratio (SR) or $N_t = N_o * SR$.

Referring to graphs B and C, it may be observed that initially, at the time of the shift command, the off-going pressure is reduced to an intermediate value, Pint, for a brief time and is then reduced to an initial value, Pioff, and then ramps down until off-going clutch slip (or turbine pulldown) is detected and then drops to zero. The brief intermediate value, Pint, is effective to reduce clutch pressure undershoot caused by solenoid dynamics.

For the on-coming clutch, graph C shows that maximum pressure is commanded for a fill time. The fill time allows nearly complete stroking of the clutch plates and obtains clutch torque capacity. Then the command pressure drops to an initial value, Pin, and ramps up slowly until it causes turbine pulldown. The combination of the on-coming upward ramp and the off-going downward ramp results in a torque transition from the off-going to the on-coming clutch. Then the on-coming clutch control enters a closed-loop control period, wherein the pressure is adjusted to maintain the on-coming clutch slip close to a calculated slip profile. When the turbine speed, $N_t$, reaches synchronous speed, the pressure command is increased to maximum value to fully engage the clutch and complete the shift.

The upshift process has several features which contribute to smooth and efficient operation. The on-coming and off-going pressure ramp commands reduce clutch timing sensitivity to the initial pressure commands. Thus, variations in clutches due to temperature or other factors do not impose critical demands on the timing of torque transition because the two ramps can continue for a variable time, subject to a limit value, so that the actual assumption of torque by the on-coming clutch determines the time of transition. Also, the immediate release of the off-going clutch following pulldown detection reduces clutch tie-up which might result in a braking action. The closed-loop control of the on-coming clutch reduces shift variation and the end-of-shift torque disturbance.

Figure 5:
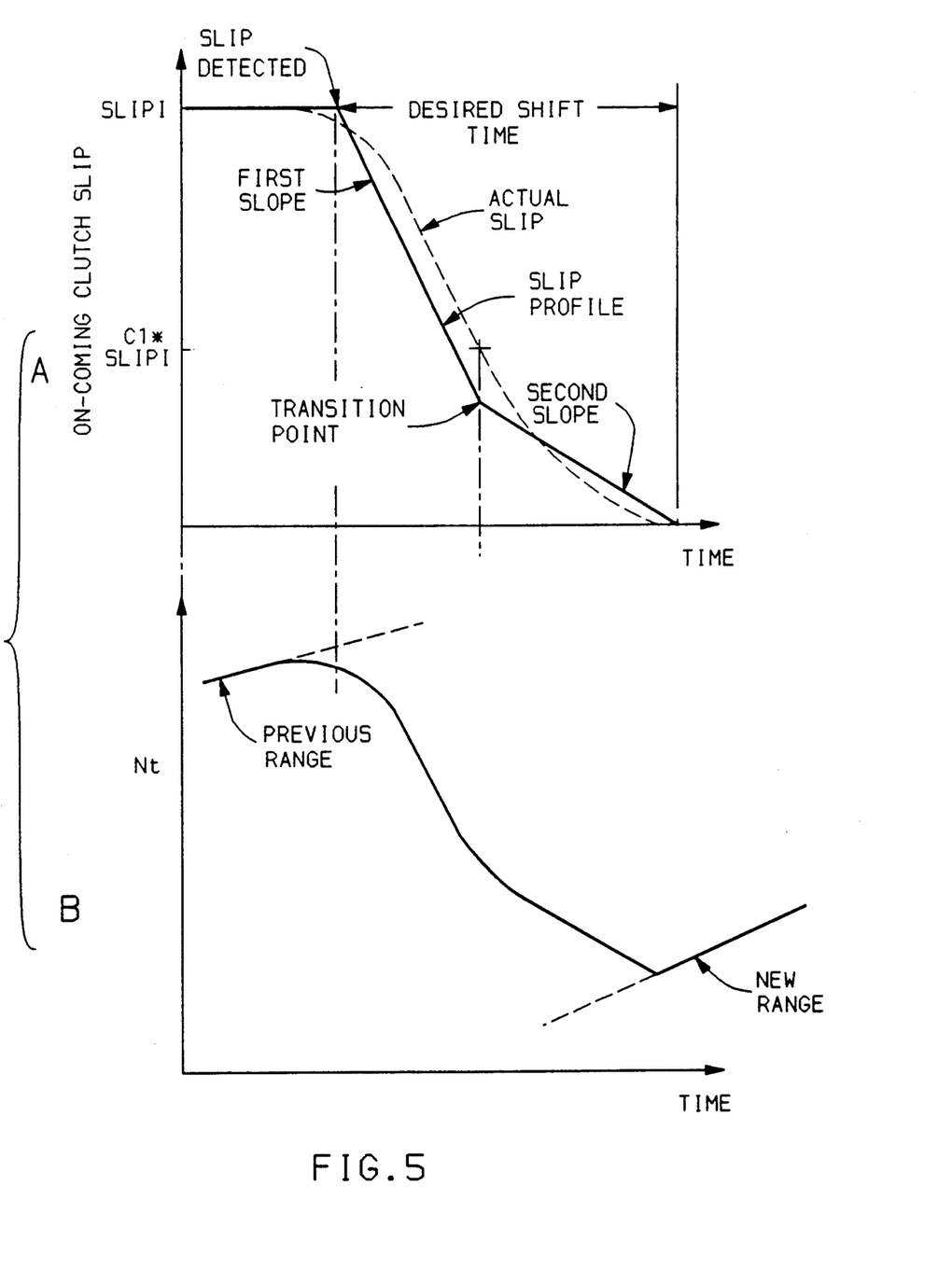
FIG. 5 is a slip diagram for the closed-loop operation of the on-coming clutch according to the invention.

The closed-loop control is better explained with reference to FIG. 5 which shows the on-coming slip speed profile in solid lines and actual slip speed in dashed lines. Slip speed is determined by comparing the turbine speed to the output speed. Specifically, slip speed is the absolute difference (times a conversion factor K) between turbine speed and the product of the output speed and the speed ratio of the lower range or $SLIP = K*ABS(N_t - N_o*SR)$. Thus, as soon as a shift command is issued there is a slip speed across the on-coming clutch. The initial slip speed, SLIPI, is the slip speed value at the detection of turbine pulldown. The slip speed profile begins at that point and decreases at a fixed rate, called the first slope. Then, at a determined point, the rate reduces to a second slope. The slopes are chosen so that, ideally, the actual slip speed can be made to smoothly go to zero within a given time period. The second slope is less steep than the first slope and reduces end of shift torque disturbance by more closely matching the acceleration rates on both sides of the on-coming clutch. By using on-coming clutch slip speed as the control target, both turbine and output speeds are taken into account when controlling the shift duration.

To determine the slopes, three constants are defined. C1 is a fraction of the initial slip value SLIPI at which the second slope begins; i.e., if $SLIP = <C1*SLIPI$, the slope changes to slope 2. C2 is the desired time to utilize the first slope. C3 is the desired overall closed loop time. C2 and C3 are used only for the slope calculation and not for direct timing purposes. Then the first slope shall be $SLOPE1 = [SLIPI - (C1*SLIPI)]/C2$. The second slope shall be $SLOPE2 = C1*SLIPI/(C3-C2)$.

The arrival at synchronization speed is determined by making several measurements in consecutive control loops. This assures that true synchronization has been achieved and maintained. If synchronization is assured, full clutch pressure is immediately applied. In the event the turbine speed goes below the synchronization speed, as shown in dashed lines in FIG. 4, it is smoothly pulled up to synchronization speed by ramping the pressure up over a fixed period. This feature prevents full application of the on-coming clutch (during closed throttle shifts) when the on-coming clutch is not completely stroked. The "below sync" condition can only result when turbine pulldown is achieved through a "neutral" condition caused by lack of on-coming clutch capacity. The ramp application of the on-coming clutch will significantly reduce end-of-shift torque disturbance.

Figure 6:
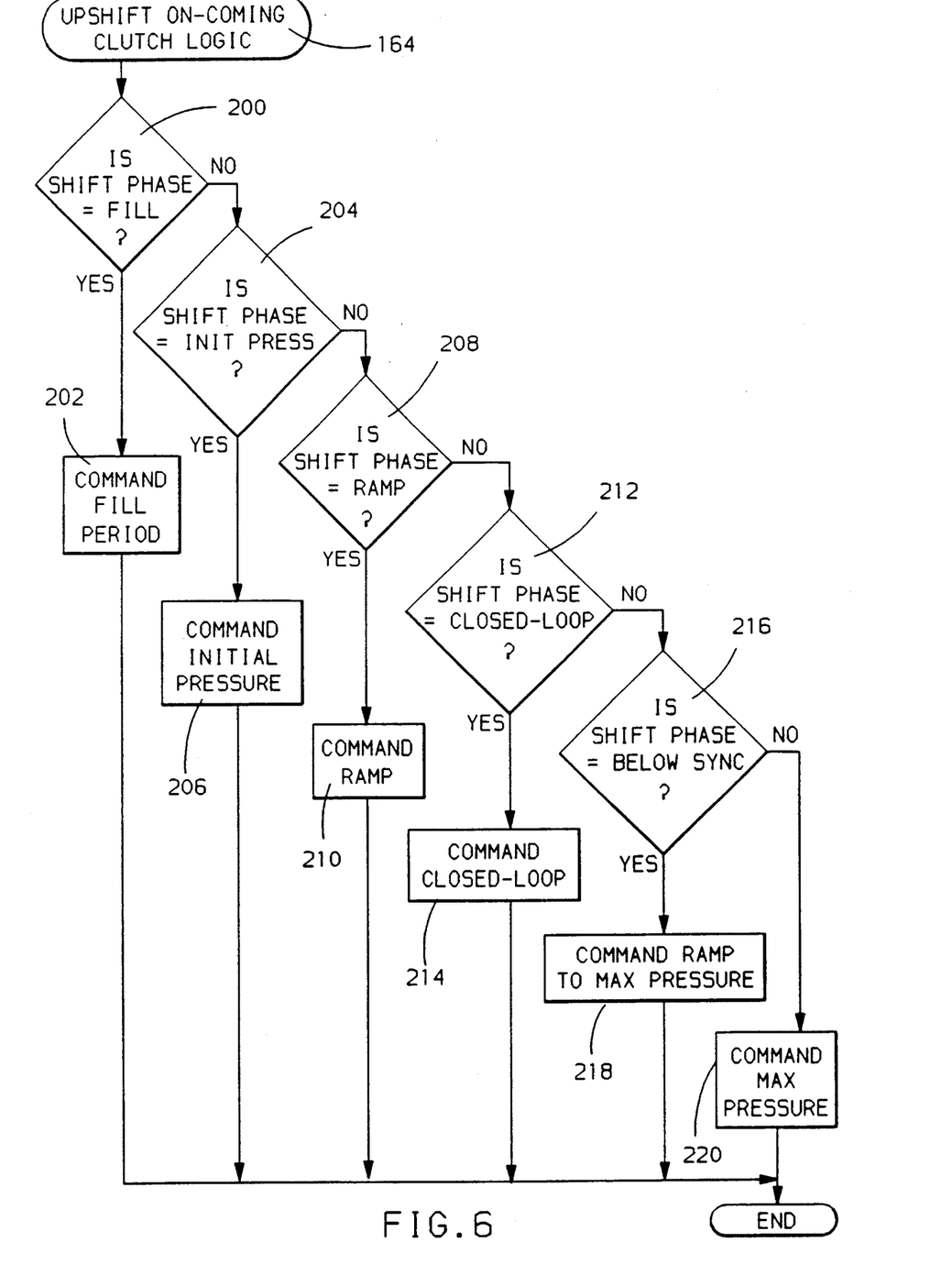
FIGS. 6 through 9 are flow diagrams illustrating the upshift logic for the on-coming clutch.
Figure 7:
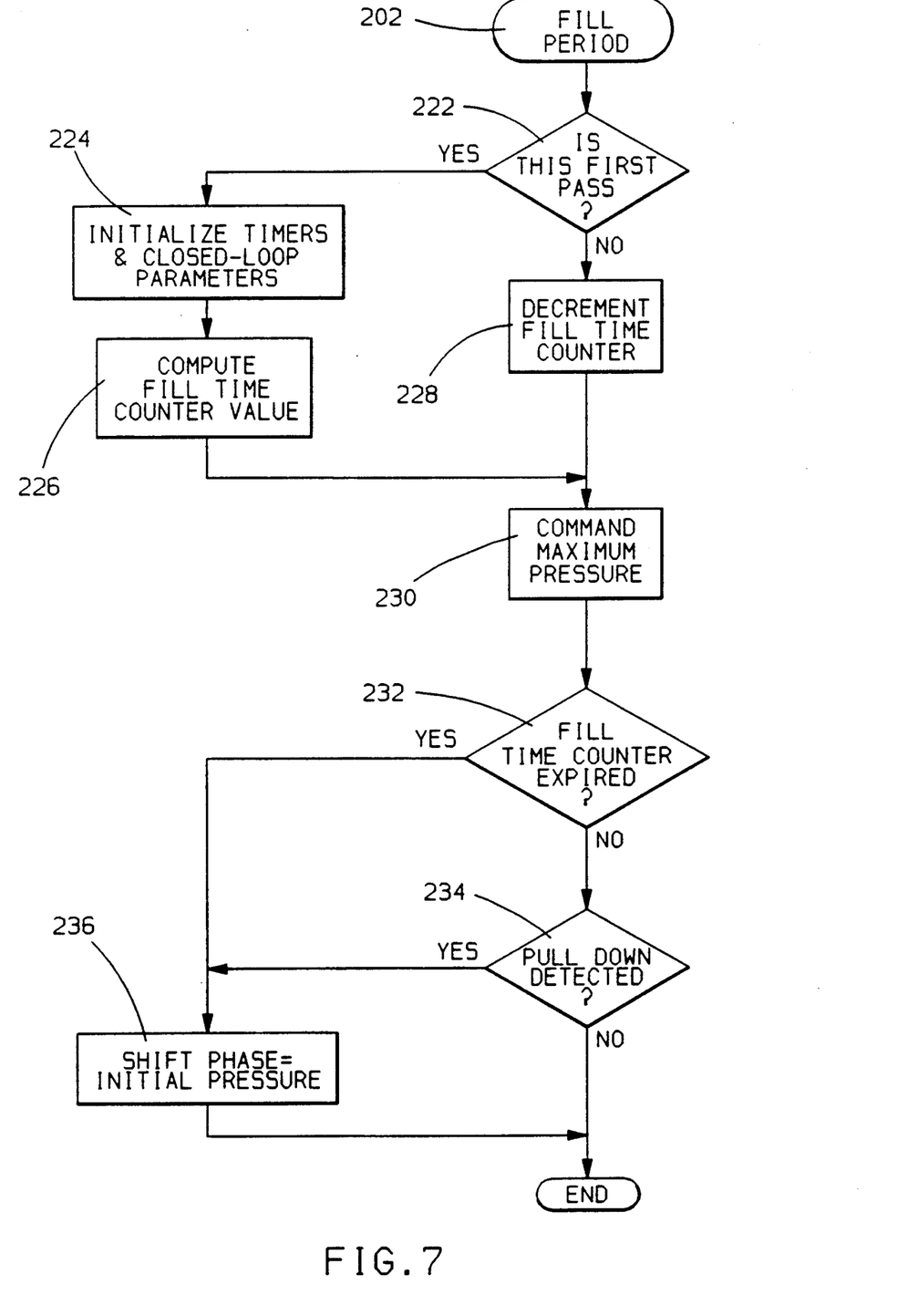
Figure 8:
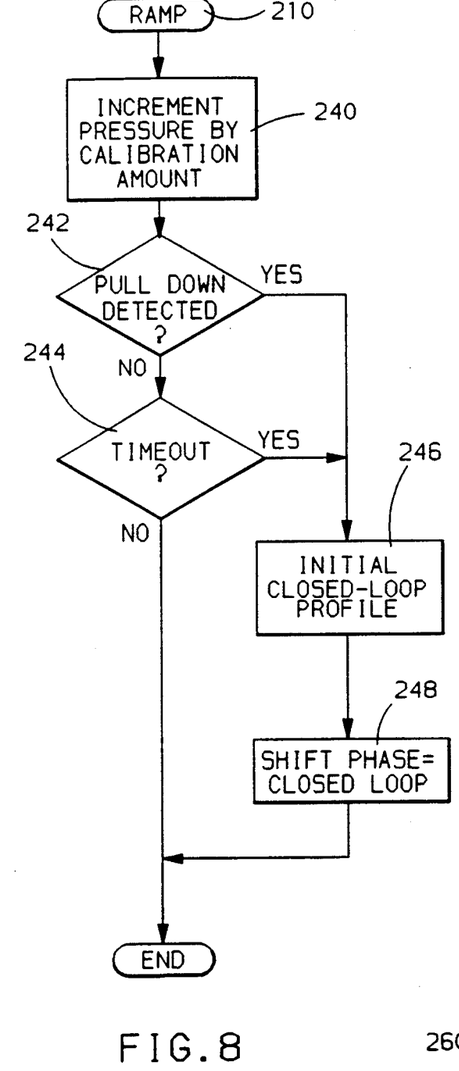
Figure 9:
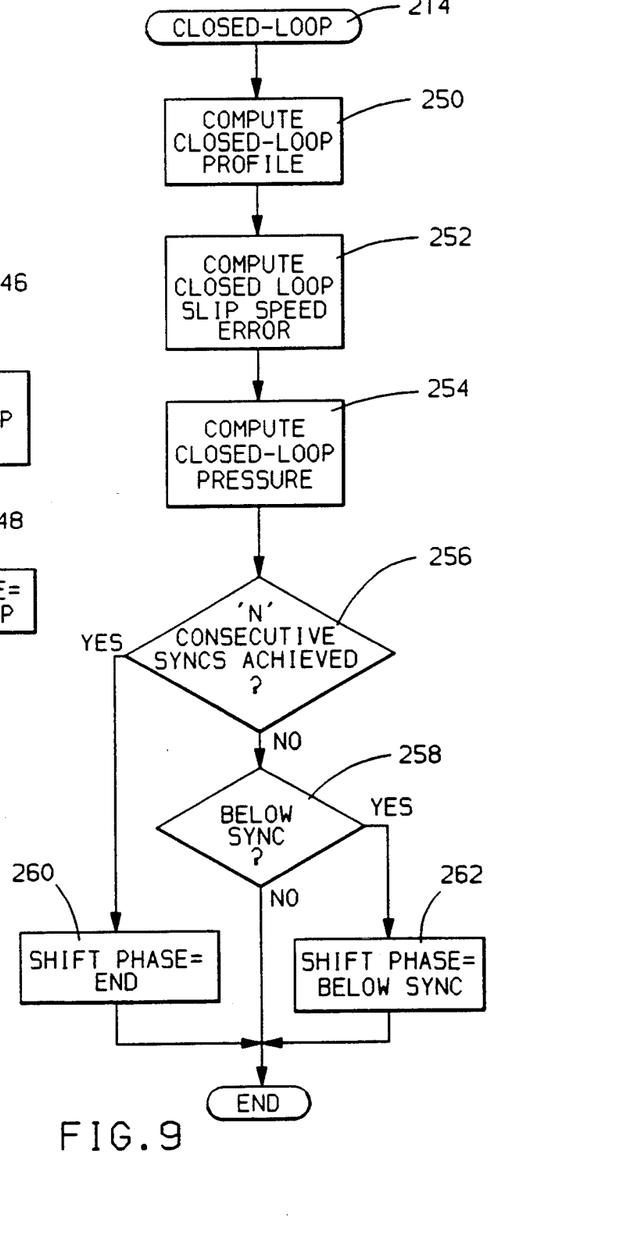

The flow charts of FIGS. 6–11 illustrate the control logic incorporated in the program for shift control. FIG. 6 shows the logic flow for the upshift on-coming clutch. SHIFT PHASE is a pointer indicating the stage of shift progress. If the SHIFT PHASE is set to FILL PERIOD <200>, the fill period routine is executed <202>, as shown in FIG. 7, otherwise, it is determined whether the SHIFT PHASE is set to INIT PRESS <204>. If so, the initial pressure routine is executed <206>; that routine sets the initial calibration pressure, Pint, and sets the SHIFT PHASE pointer to RAMP. If the SHIFT pHASE is RAMP <208>, the ramp routine is executed <210>, as shown in FIG. 8. If the SHIFT PHASE is CLOSED LOOP <212>, the closed-loop routine is executed <214>, as shown in FIG. 9. If SHIFT PHASE is set to BELOW SYNC <216>, the below sync routine is executed <218>. The below sync routine increments the pressure by a set amount in each control loop until maximum pressure is reached. If SHIFT PHASE is not BELOW SYNC the maximum pressure is commanded <220>.

The fill period routine is shown in FIG. 7. If it is the first pass through this loop <222>, the timers and closed-loop parameters are initialized <224> and fill time is computed <226>; the fill time is expressed by a counter as a number of control loops and sets a maximum time for filling. If it is not the first pass, the fill time counter is decremented <228> and the maximum pressure is commanded <230>. If the fill time counter is not expired <232> and turbine pulldown is not detected <234>, the loop repeats. Otherwise, SHIFT PHASE is set to INIT PRESS <236> and the program control goes to that phase.

The ramp routine, as shown in FIG. 8, increments pressure by a set amount <240>. If turbine pulldown <242> or timeout <244> occurs, the closed-loop profile is initialized <246> and SHIFT PHASE is set to CLOSED LOOP <248>. Otherwise, the ramp routine repeats until one of the above requirements is met. The timeout is based on the previously calculated fill time plus a constant value to limit the total time elapsed between the shift initiation and the initiation of closed loop.

The closed-loop routine as shown in FIG. 9, comprises computing the closed-loop profile <250>, computing a closed-loop slip speed error <252>, computing the closed-loop pressure required to reduce the error <254>, and test for achieving sync <256> and below sync condition <258>. If neither condition applies, the loop repeats to control the clutch slip. If a set number "N" of consecutive sync speeds are detected <256>, the SHIFT PHASE is set to END <260> which causes maximum pressure to be applied <220>. If the below sync condition is detected <258>, SHIFT PHASE is set to BELOW SYNC <262>.

Figure 10:
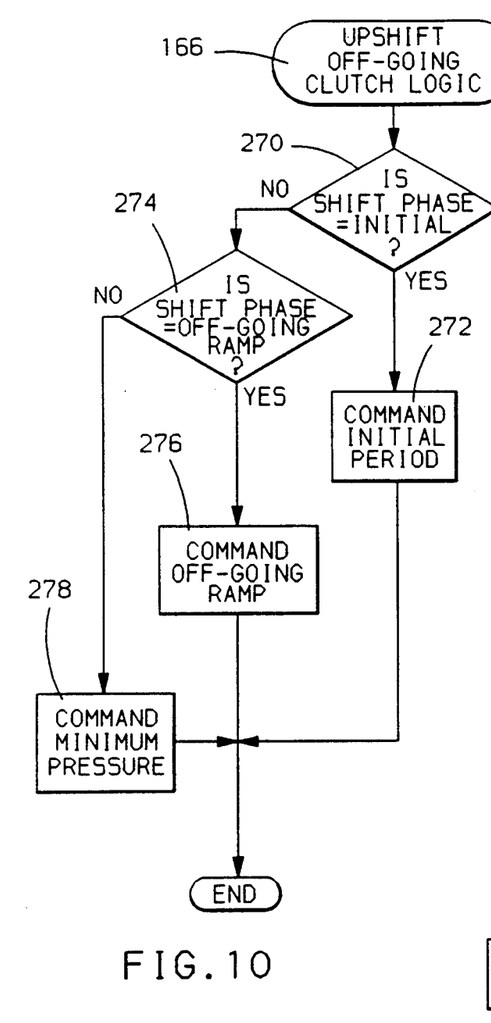
FIGS. 10 and 11 are flow diagrams illustrating the upshift logic for the off-going clutch.
Figure 11:
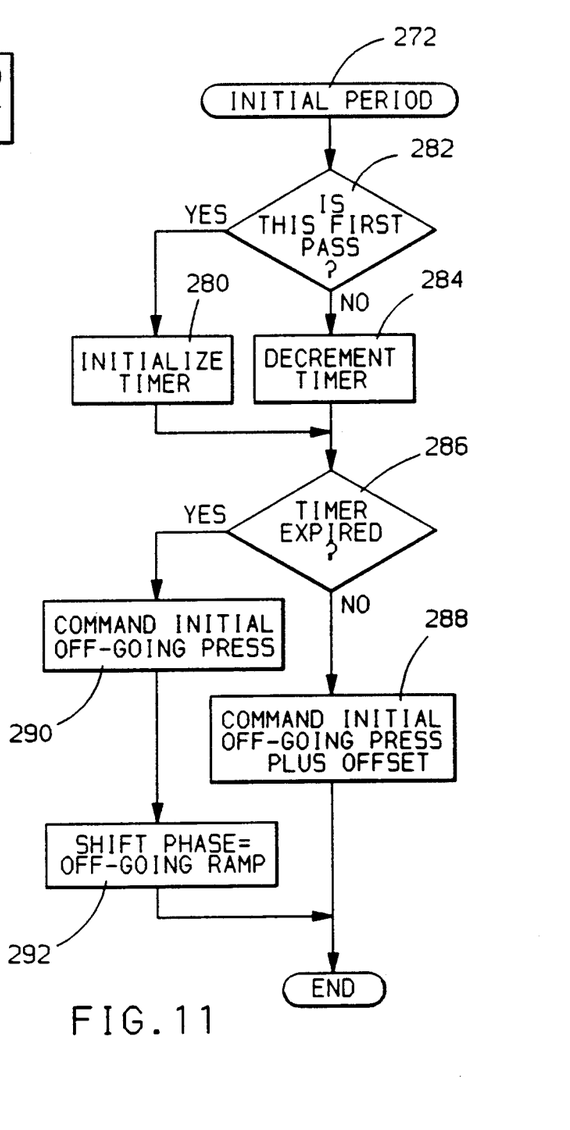

The upshift off-going clutch control 166 is shown in FIG. 10. If SHIFT PHASE is set to INITIAL <270>, the initial period routine is executed <272> as shown in FIG. 11. If the SHIFT PHASE is set to OFF-GOING RAMP <274>, the off-going ramp routine <276> is executed. That routine decrements pressure by a set amount if the on-coming SHIFT PHASE is not in CLOSED LOOP or commands an exhaust state if it is in CLOSED LOOP. In the latter case, the minimum pressure command <278> is executed.

In FIG. 11, the initial period routine 272 initializes a timer <280> if it is the first pass <282>, or decrements the timer <284> if it is not the first pass. Then, if the timer is not expired <286>, the initial off-going pressure plus an offset is commanded <288> to establish the intermediate pressure, Pint. If the timer is expired, the initial off-going pressure value Pioff, is commanded <290> and the SHIFT PHASE is set to OFF-GOING RAMP <292>.

While this invention has been described in reference to the illustrated embodiment, it is expected that various modifications will occur to those skilled in the art. In this regard, it should be understood that systems incorporating such modifications may fall within the scope of this invention which is defined by the appended claims.

The embodiments of the invention in which an exclusive property or privilege is claimed are defined as follows:

1. In a vehicular automatic transmission having an input and an output, a turbine connected to the input to couple driving torque thereto, wherein a shift from a first speed ratio to a second speed ratio is carried out through concurrent disengagement of off-going fluid pressure operated torque transmitting means associated with the first of such speed ratios and engagement of on-coming fluid pressure operated torque transmitting means associated with the second of such speed ratios, and further having turbine and output speed sensing means, a method of controlling the torque transmitting means to effect a shifting from the first speed ratio to the second speed ratio comprising the steps of:

commanding a progressively decreasing hydraulic pressure on the off-going torque transmitting means, preparing the on-coming torque transmitting means to assume torque capacity by commanding a sufficient pressure on the on-coming torque transmitting means, then initiating a closed-loop control period of the on-coming torque transmitting means, during the closed-loop control period, establishing a slip speed profile including a ramp beginning at an initial slip speed and having a first slope and a second slope, the first slope being sufficiently steep to quickly reduce the slip speed and the second slope being less steep to effect smooth synchronization of the on-coming torque transmitting means, measuring the slip speed of the on-coming torque transmitting means, and progressively changing the pressure on one of the torque transmitting means to control the measured slip speed in accord with the profile, whereby slip speed is controlled toward zero slip.

2. The invention as defined in claim 1 the step of establishing the slip speed profile includes setting a fraction of the initial slip speed at which the first slope terminates, a desired time to utilize the first slope, and a desired overall slip time, calculating the first slope based on the initial slip speed, the fraction and the desired time, calculating the second slope based on the initial slip speed, the fraction, the said desired time, and the desired overall slip time, and changing from the first slope to the second slope when the actual slip speed reaches said fraction of the initial slip speed.

3. In a vehicular automatic transmission having an input and an output, a turbine connected to the input to couple driving torque thereto, which an upshift from one transmission speed ratio to another is carried out through concurrent disengagement of an off-going fluid pressure operated torque transmitting device associated with the higher of such speed ratios and engagement of an on-coming fluid pressure operated torque transmitting device associated with the lower of such speed ratios, and further having turbine and output speed sensing means, the method of controlling the torque transmitting devices to effect a shifting from the higher speed ratio to the lower speed ratio comprising the steps of:

commanding a progressively decreasing hydraulic pressure on the off-going torque transmitting device during a pressure relief period, during the said pressure relief period, commanding supplied pressure to the on-coming torque transmitting device for a set time and then commanding the supplied pressure to an initial value and increasing the commanded pressure at a rate calibrated to achieve a timely decrease in turbine speed, then removing the pressure from the off-going torque transmitting device and initiating a closed-loop control period of the on-coming torque transmitting device, during the closed-loop control period, establishing a slip speed profile beginning at an initial slip speed and having a first slope and a second slope, setting a fraction of the initial slip speed at which the first slope terminates, a desired time to utilize the first slope, and a desired overall slip time, calculating the first slope based on the initial slip speed, the fraction and the desired time, calculating the second slope based on the initial slip speed, the fraction, the said desired time, and the desired overall slip time, and changing from the first slope to the second slope when the actual slip speed reaches said fraction of the initial slip speed, measuring the slip speed of the on-coming torque of the on-coming torque transmitting device, and progressively changing the commanded on-coming torque transmitting device pressure to control the slip speed in accord with the profile, and determining synchronization of the torque transmitting device from a comparison of the turbine speed and the output speed and, when turbine speed decreases to synchronization value, increasing the commanded on-coming pressure to a maximum value to complete the upshift.

* * * * *